US006883224B2

(12) United States Patent
Thomas

(10) Patent No.: US 6,883,224 B2
(45) Date of Patent: Apr. 26, 2005

(54) GAS TURBINE IMPELLER ALIGNMENT TOOL AND METHOD

(75) Inventor: Erik C. Thomas, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 42 days.

(21) Appl. No.: 10/235,904

(22) Filed: Sep. 4, 2002

(65) Prior Publication Data

US 2003/0147742 A1 Aug. 7, 2003

Related U.S. Application Data

(60) Provisional application No. 60/353,222, filed on Feb. 1, 2002.

(51) Int. Cl.[7] .......... B23P 19/04
(52) U.S. Cl. .......... 29/559
(58) Field of Search .......... 29/263, 281.5, 29/281.1, 259; 269/47, 52

(56) References Cited

U.S. PATENT DOCUMENTS

| | | | | | |
|---|---|---|---|---|---|
| 1,513,031 | A | * | 10/1924 | Brown | 29/259 |
| 2,736,954 | A | * | 3/1956 | Palmer | 29/259 |
| 3,958,739 | A | | 5/1976 | Wicker et al. | |
| 4,199,861 | A | | 4/1980 | Buckman et al. | |
| 4,210,990 | A | * | 7/1980 | Krieger | 29/263 |
| 4,212,187 | A | | 7/1980 | Scholz | |
| 4,489,605 | A | | 12/1984 | Kops | |
| 4,492,018 | A | | 1/1985 | Rode | |
| 4,562,631 | A | | 1/1986 | Welch | |
| 5,210,945 | A | | 5/1993 | Suzuki | |
| 5,666,724 | A | | 9/1997 | Kolsun | |
| 5,806,161 | A | | 9/1998 | Schneider | |
| 6,024,272 | A | | 2/2000 | Myers | |
| 6,273,671 | B1 | | 8/2001 | Ress, Jr. | |

* cited by examiner

*Primary Examiner*—Robert C. Watson
(74) *Attorney, Agent, or Firm*—Douglas A. Mullen, Esq.

(57) ABSTRACT

An apparatus and method for centering a shaft (for an impeller or other rotating component) in a gas turbine engine, such as that used in aircraft or other vehicles. The apparatus includes a base, at least one arm and an actuator. The arm is connected to the base and the actuator is located on a predetermined axis and aligns the impeller shaft to that axis. The actuator also applies a force to the actuator to simulate actual operational forces in the engine so that proper tolerances can be measured. The method includes steps of coupling the apparatus to a locator surface, impeller shaft with the actuator and moving the actuator such that an axial load is provided on the shaft.

16 Claims, 6 Drawing Sheets

GAS TURBINE IMPELLER ALIGNMENT TOOL AND METHOD

CROSS-REFERENCE TO RELATED APPLICATION

This application claims the benefit of U.S. Provisional Application No. 60/353,222, filed Feb. 1, 2002.

FIELD OF THE INVENTION

The present invention relates to gas turbine engine repair tools and, more particularly, to a device used to align the impeller of a gas turbine engine, such as those found on aircraft and other vehicles.

BACKGROUND OF THE INVENTION

Jet engines (also called gas turbine engines) are generally designed and built robustly and safely. Nonetheless, these well-designed engines may need to undergo periodic maintenance and/or repair. Such maintenance and repair operations may include partial or complete disassembly of the engine, and removal, repair, or replacement, of one or more components within the engine. Some of the components may be installed in the engine according to relatively tight tolerances. Although these same components may be manufactured to within design specification tolerances, manufacturing variations may still exist. Thus, engine re-assembly following maintenance and/or repair may include instances in which these variations are accounted for by using, for example, mechanical shims.

For example, in the compressor section of a jet engine, it is desirable that the axial clearance between the compressor impeller and the shroud, which surrounds a portion of the impeller, is minimized for efficient impeller operation. Generally, this is because the centrifugal compression increases as the shroud axial clearance decreases, which may result in an engine that runs more efficiently. Conversely, as this axial clearance increases, engine efficiency may decrease. To obtain the appropriate clearance following maintenance or repair, the impeller shaft may be manually centered, and a feeler gauge may be used to check the clearance between the impeller vanes and the shroud. The impeller and shaft may be manually adjusted and mechanical shims may then be fitted between the shroud and another portion of the engine to obtain the appropriate clearance.

The above-described method of centering the impeller shaft and determining and adjusting the impeller to the appropriate clearance may present certain drawbacks. For example, the shaft may not be appropriately centered and may lead to shaft imbalance when the engine is placed back into operation. Additionally, the high pressure case and high pressure shaft bearings that rotationally support the high pressure impeller shaft may have some radial and axial play, which may lead to further inconsistencies in measuring and setting the clearance between the impeller and the shroud. Moreover, during normal operation of the engine, the impeller and shaft will experience an axial force generally not present during the re-assembly of the engine. Because the bearings rotationally supporting the shaft may have some axial play, the clearance between the impeller and shroud may decrease beyond what was previously set when the engine was re-assembled. This decreased clearance may result in less than optimum engine performance and, in some cases, may result in the impeller physically contacting the shroud.

Therefore, there is a need for an apparatus and method that addresses one or more of the above-noted drawbacks. Namely, an apparatus and method that allows accurate centering of the impeller shaft within a jet engine, and/or allows accurate measurement and adjustment of clearances between the impeller and other components within the engine, and/or allows operational axial loads to be imposed during the measurement and adjustment of such clearances. The present invention addresses one or more of these needs.

SUMMARY OF THE INVENTION

The present tool and method of using the tool substantially removes or minimizes variation in the clearance measurement and adjustment process during jet engine maintenance and/or repair. The present tool provides centering of the high pressure shaft of an engine supported by any number of bearings and minimization of any radial and axial bearing play. The present tool further provides axially loading of the shaft to simulate normal engine operation, and provides improved measurement accuracy during assembly, repair and/or overhaul of the engine.

In one embodiment, and by way of example only, a method for centering the shaft and determining a clearance between the impeller and the shroud, for a jet engine including at least a compressor module having an impeller mounted on a shaft and a shroud positioned proximate to the impeller is provided. The method includes the steps of obtaining a shaft centering tool having a base adapted for coupling the tool to a locator surface, at least one arm having a first end coupled to the base and a second end separated from the locator surface, and an actuator mounted on the arm and aligned on a predetermined axis to engage the impeller shaft, apply force thereto and align the shaft with the predetermined axis, coupling the tool to the locator surface, moving the actuator into engagement with an end of the shaft to place a predetermined force on the shaft, and measuring the clearance between the impeller and the shroud.

In another embodiment a tool for centering an impeller shaft in a jet engine in reference to a locator surface is provided, where the tool includes a base, at least one arm, and an actuator. The base is adapted for coupling the tool to the locator surface. The at least one arm includes a first end coupled to the base and a second end separated from the locator surface. The actuator is mounted on the arm and aligned on a predetermined axis to engage the impeller shaft, apply force thereto and align the shaft with the predetermined axis.

In yet another embodiment, a tool for centering an impeller shaft in a jet engine with reference to a locator surface is provided. The tool includes a base, a hub, at least one arm and a threaded rod. The base is adapted for coupling the tool to the locator surface. The hub includes a threaded inner surface defining an opening. The at least one arm has a first end mounted to the base and a second end mounted to the hub to locate the hub along a predetermined axis. The threaded rod is engaged with the threaded inner surface of the hub and has at least a first end adapted to engage the shaft and a second end adapted to engage a nut, and an outer surface that includes threads with the predetermined thread pitch.

Other independent features and advantages of the preferred apparatus and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description of the various embodiments, it is to be appreciated that the shaft centering device described below may be used in conjunction with various types of gas turbine engines, such as an aircraft turbofan jet engine, that include one or more rotating shafts. The skilled artisan will appreciate that the below description, when referring to a turbofan jet engine, encompasses either single stage or multistage jet engine architectures. Thus, although the present invention is, for convenience of explanation, depicted and described as being implemented with a two-stage turbofan jet engine, it will be appreciated that it can be implemented with other engine designs.

Figure 1:
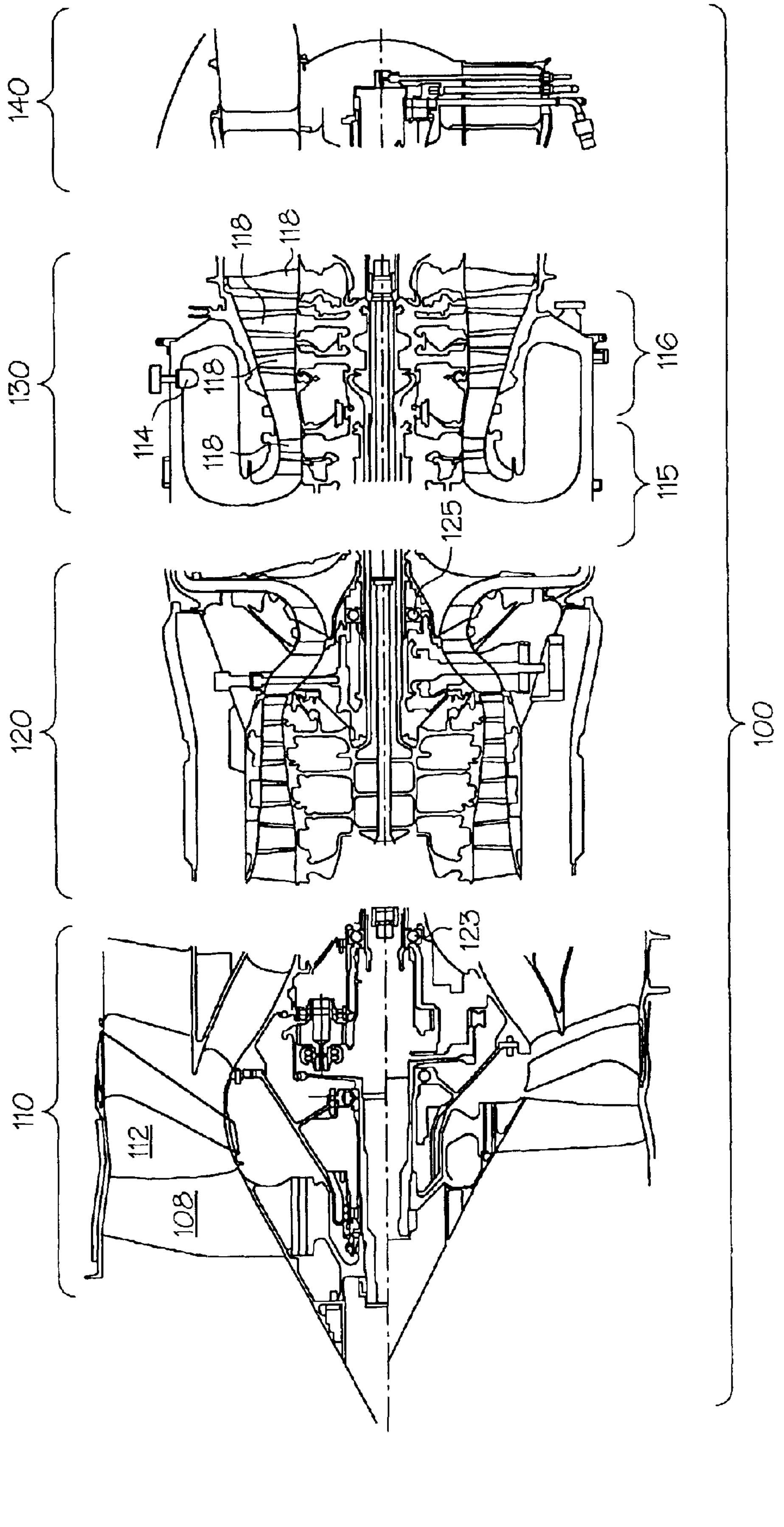
FIG. 1 is a partial cross-section side view of a gas turbine engine with the major sections of the engine separated from one another.

Turning now to the description, and with reference first to FIG. 1, a partial cross-section side of a turbofan jet engine, with which the novel impeller alignment tool 400 may be used, is depicted. As this figure illustrates, a turbofan jet engine 100 includes at least four major modules. These major modules include a fan module 110, a compressor module 120, a combustor and turbine module 130 and an exhaust module 140.

The fan module 110 is positioned at the front, or "inlet" section of the engine 100, and includes a fan 108 that induces air from the surrounding environment into the engine 100. The fan module 110 accelerates a fraction of this air toward the compressor module 120, and the remaining fraction is accelerated into and through a bypass 112, and out the exhaust module 140. The compressor module 120 raises the pressure of the air it receives to a relatively high level. This high-pressure compressed air then enters the combustor and turbine module 130, where a ring of fuel nozzles 114 (only one illustrated) injects a steady stream of fuel. The injected fuel is ignited by a burner (not shown), which significantly increases the energy of the high-pressure compressed air. This high-energy compressed air then flows first into a high pressure turbine 115 and then a low pressure turbine 116, causing rotationally mounted turbine blades 118 on each turbine 115, 116 to turn and generate energy. The energy generated in the turbines 115, 116 is used to power other portions of the engine 100, such as the fan module 110 and the compressor module 120. The air exiting the combustor and turbine module 130 then leaves the engine 100 via the exhaust module 140. The energy remaining in the exhaust air aids the thrust generated by the air flowing through the bypass 112.

Figure 2:
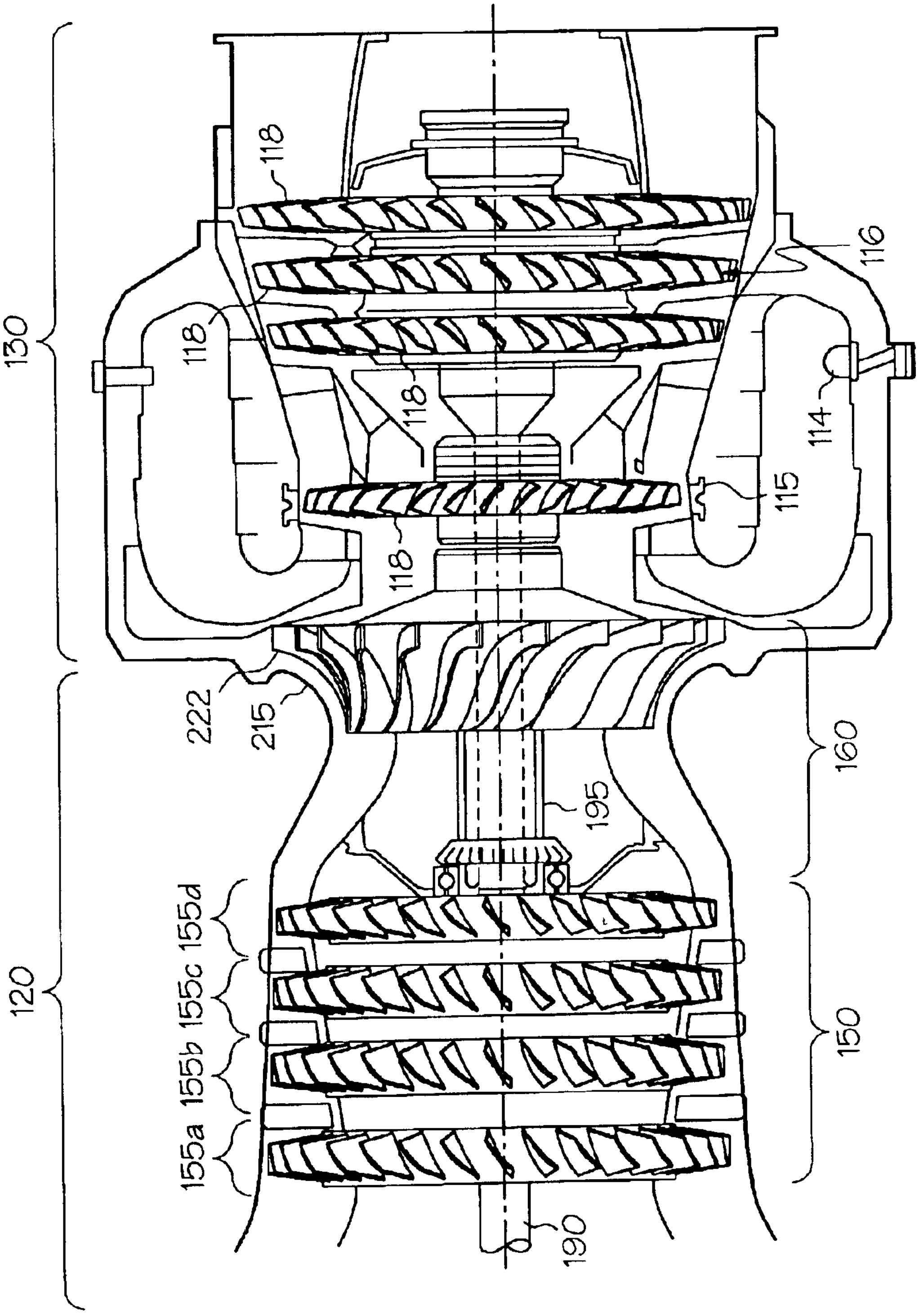
FIG. 2 is a close up cross-section side view the compressor, combustor and turbine sections of a gas turbine engine depicted in FIG. 1.
Figure 3:
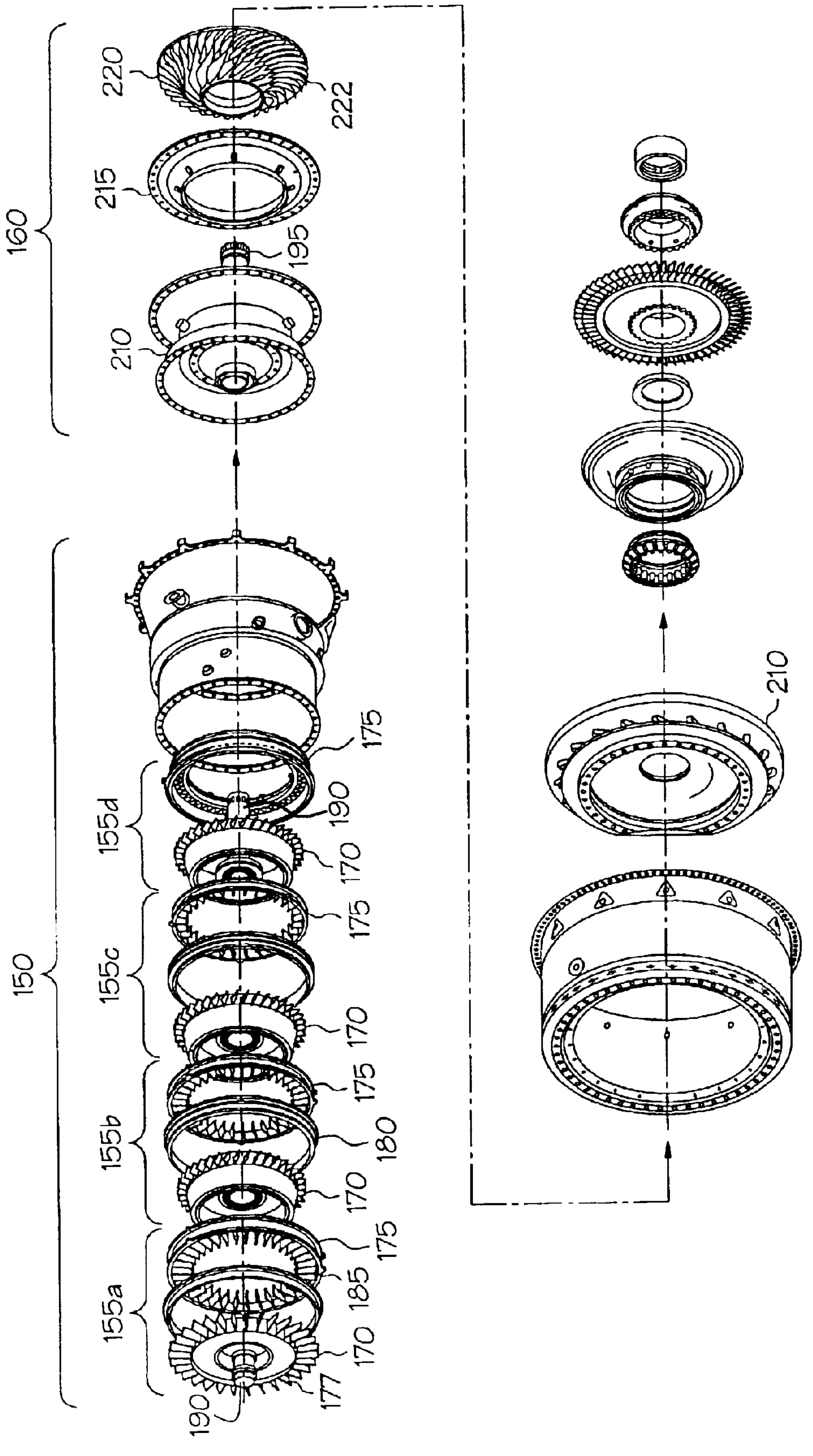
FIG. 3 is an exploded view of the compressor section depicted in FIG. 2.

With reference now to FIGS. 2 and 3, a more detailed description of the compressor module 120 will be provided. As shown, the compressor module 120 includes a low pressure section 150 and a high pressure section 160. The low pressure section 150 includes four stages 155*a*–*d*, each of which includes four rotors 170 and four stators 175. Each of the rotors 170 has a plurality of blades 177 and is surrounded by a shroud 180. As shown more clearly in FIGS. 2 and 3, each of the rotors 170 is rotationally mounted on a low pressure shaft 190, which is driven by the low pressure turbine 116. As the rotors 170 rotate, the blades 177 force air through each of the stators 175 in subsequent sections. Each stator 175 also includes a plurality of vanes 185. As the air from the rotors 170 travels across the vanes 185, it is forced to travel at a substantially optimum angle to the next stage, thereby increasing the air pressure as the air travels from stage to stage.

The high pressure section 160 includes a high pressure diffuser case 210, a shroud 215, and a high pressure impeller 220. The high pressure diffuser case 210 couples the low pressure section 150 to the high pressure section 160 and directs the air exhausted from the fourth stage 155*d* of the low pressure section 150 at the appropriate angle into high pressure impeller 220. The shroud 215 is mounted to the diffuser case 210 and surrounds a portion of the high pressure impeller 220. The high pressure impeller 220 has a plurality of vanes 222, and is mounted on a impeller shaft 195. The impeller shaft 195, as shown more clearly in FIG. 1, is rotationally supported by a first set of bearings 123 and a second set of bearings 125. The impeller shaft 195 surrounds the low pressure shaft 190, and is driven by the high pressure turbine 115. Thus, the impeller shaft 195 rotates independently of the low pressure shaft 190. As shown more clearly in FIG. 2, the shroud 215 and the vanes 222 flare radially outwardly. The clearance between the shroud 215 and the vanes 222, as was previously noted, is set to a predetermined magnitude to obtain substantially optimum engine performance.

Figure 4:
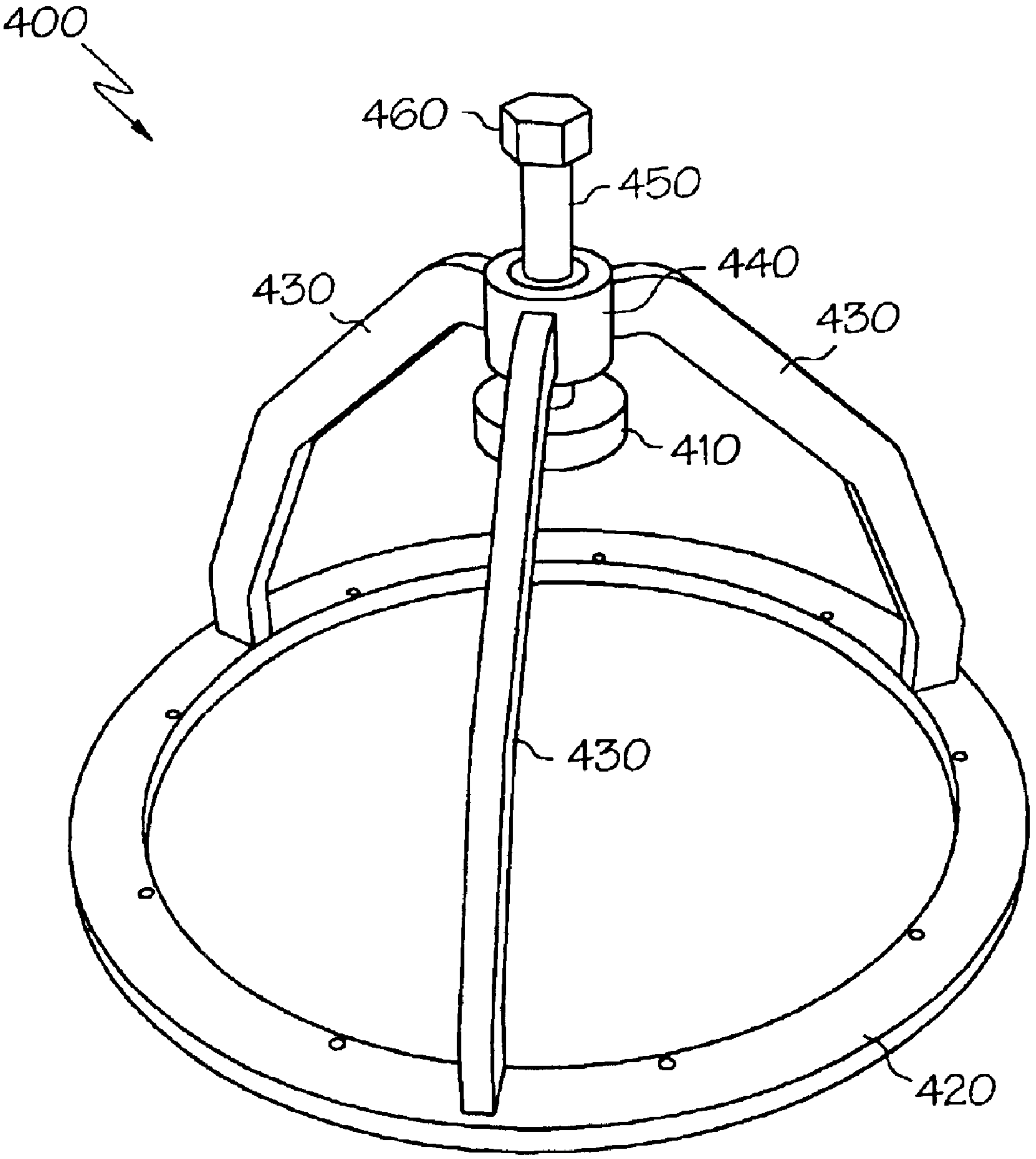
FIG. 4 is a perspective view of an embodiment of the impeller alignment tool.
Figure 6:
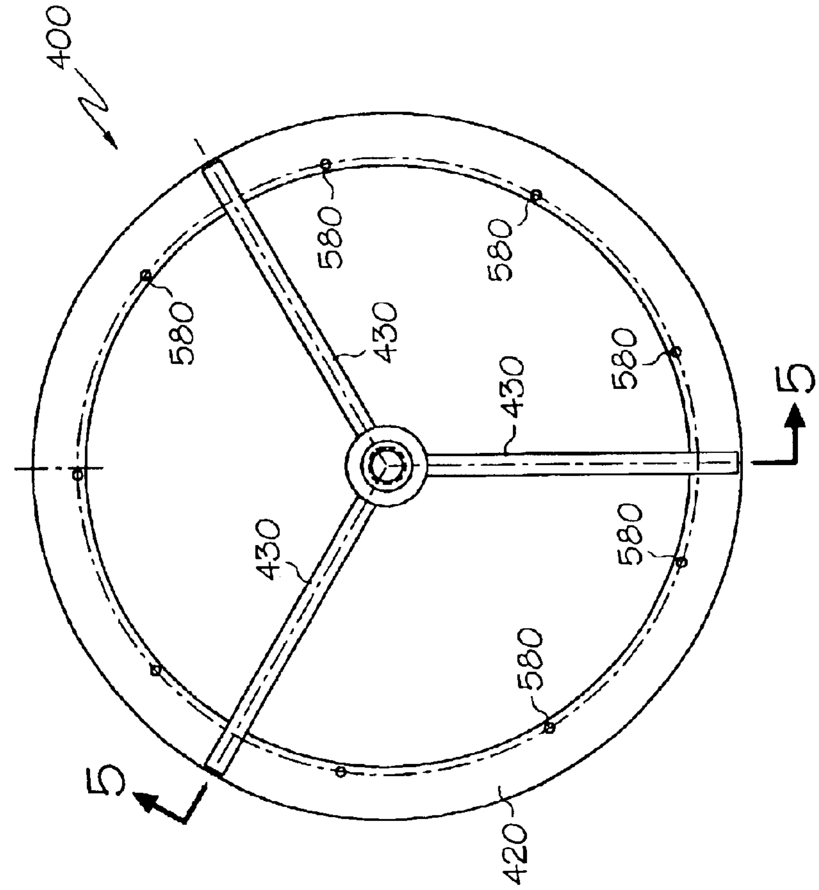
FIGS. 5 and 6 are side and top views, respectively, of the tool depicted in FIG. 4.
Figure 5:
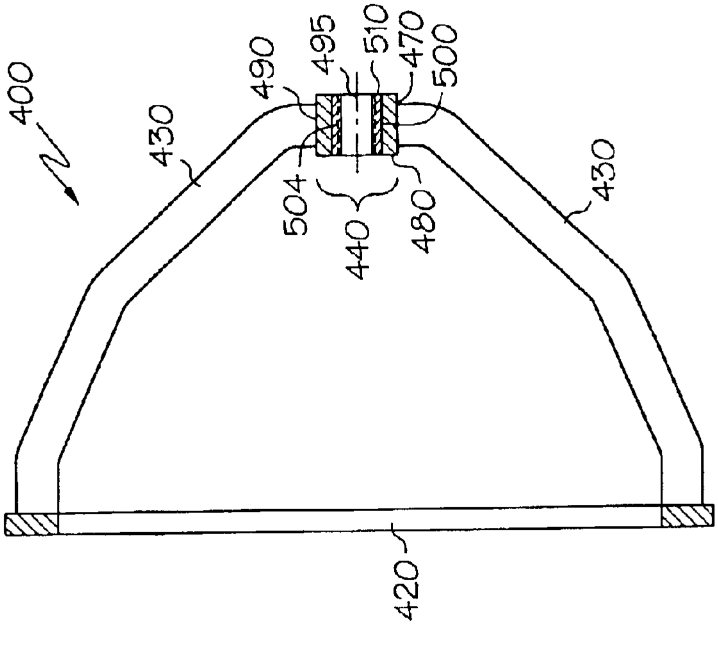

During assembly, or following engine maintenance, repair and/or overhaul of the engine 100, the impeller shaft 195 and impeller 220 may need to be centered, and the clearance between the impeller vanes 222 and the shroud 215 checked and adjusted to obtain substantially optimal engine performance. To do so, a shaft alignment and loading tool 400 may be used. A particular preferred embodiment of the tool 400 is depicted in FIGS. 4, 5, and 6, and will now be described in detail. The tool 400 includes a base 420, three arms 430, and an actuator 500. The base 420 is used to couple the tool 400 to a locator surface. The locator surface may be the collar 212 of the high pressure diffuser case 210 (see FIG. 2). Thus, the base 420 may include holes 580 that line up with threaded holes in the high pressure diffuser case collar 212 (see FIG. 6). As may be appreciated by one skilled in the art, the locator surface may be other sections of the engine 100, or may be some surface that is not part of the engine at all. By way of non-limiting example, the base 420 could completely surround the high pressure compressor section and be coupled to a floor, table, cart, or any one of numerous other surfaces. Additionally, although in the depicted embodiment, the base 420 is substantially circular in shape, it should be appreciated that the base 420 could be made into any one of numerous other shapes.

The present actuator 500 includes a hub 440, and a rod 450. However, the actuator 500 is not limited to a hub 440 and rod 450 structure, and may alternately be a structure located at the end of each arm that can mechanically, electrically, pneumatically or hydraulically apply force to the impeller shaft 195. In the present actuator 500, that includes the hub 440, and the rod 450, the hub 440, as shown more particularly in FIG. 5, includes a top surface 470, a bottom surface 480, forming an inner surface 500. In the depicted embodiment, a sleeve 510 is inserted into the hub 440 and is coupled to the hub inner surface 500. The sleeve 510 includes an inner surface 405 and, as will be discussed more fully below, in a preferred embodiment the sleeve inner surface 504 is threaded. It will be appreciated that the sleeve 510 may be omitted and that the hub inner surface 500 may instead by threaded.

Each of the arms 430 is coupled between the base 420 and the hub 440. In the depicted embodiment, the arms 430 are coupled to the hub side surface 490, though it will be appreciated that the tool 400 is not limited to this configuration. For example, the arms 430 could be coupled to any one or more of the outer surfaces, including the hub top surface 470 or the hub bottom surface 480. The arms 430 may be coupled to the base 420 and hub 440 by, among other things, a welding process. Alternately, the arms 430 may be integrally formed as part of the base 420 and/or the hub 440. In the depicted embodiment, three arms 430 are depicted. However, it will be appreciated that other embodiments of the tool 400 may include one or two arms. And yet other embodiments of the tool 400 may include more than three arms. Although three arms are depicted, any suitable connecting structure can be used between the hub and base. In a preferred embodiment, the arms 430 are shown to be formed into a substantially arch-like shape. However, the skilled artisan will appreciate that the arms 430 can be fashioned in any one of numerous shapes including, but not limited to straight, linear, or angular. Additionally, the skilled artisan will appreciate that the length of the arms 430 may vary depending on the desired distance between the hub 440 and the base 420. It will also be appreciated that the base 420, the arms 430, and the hub 440 may be made out of any one of numerous materials. In a preferred embodiment however, each is made of an aluminum alloy.

The rod 450 is inserted into and through the hub opening 495 and the sleeve 510, if it is installed. The rod 450 is adjustably movable axially within the hub 440. That is, the rod 450 may be moved axially within the hub 440, and substantially fixed in a particular position. In a preferred embodiment, the rod 450 is threaded with the same thread pitch as the sleeve 510 to provide this adjustable axial movement. In the depicted embodiment, an adjustment nut 460 is coupled to a first end 540 of the rod 450. The adjustment nut 460 allows a tool, such as a wrench, to be used to rotate the rod 450 and thereby axially move the rod 450. The nut 460 may be threaded onto the rod first end 540 and then welded in place, it may additionally be formed integral therewith, welded or brazed in place, or coupled via fasteners.

Figure 7:
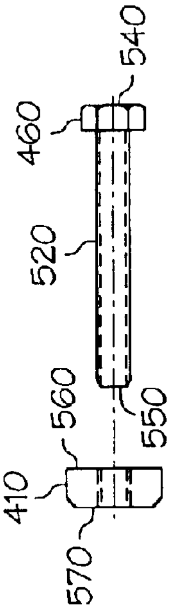
FIG. 7 is a side view of a threaded rod and pilot cone that may be used with the tool depicted in FIGS. 4–6.

A shaft engagement piece, or pilot cone 410, is coupled to a second end 550 of the rod. As shown more particularly in FIG. 7, the pilot cone 410, in a preferred embodiment, includes at least a top surface 560, a bottom surface 570, and a side surface 580. The bottom surface 570, as will be described more fully below, is used to contact an end of the impeller shaft 195. In some jet engines, the end of the impeller shaft 195 may have a beveled surface on the inside diameter thereof (beveled surface not illustrated). For these impeller shaft configurations, the pilot cone bottom surface 570 may be beveled with the same bevel angle as the beveled surface in the impeller shaft 195. Similar to the adjustment nut 460, the pilot cone 410 may also be threaded onto the rod second end 550, formed integrally therewith, welded or brazed in place, or coupled via fasteners.

Figure 8:
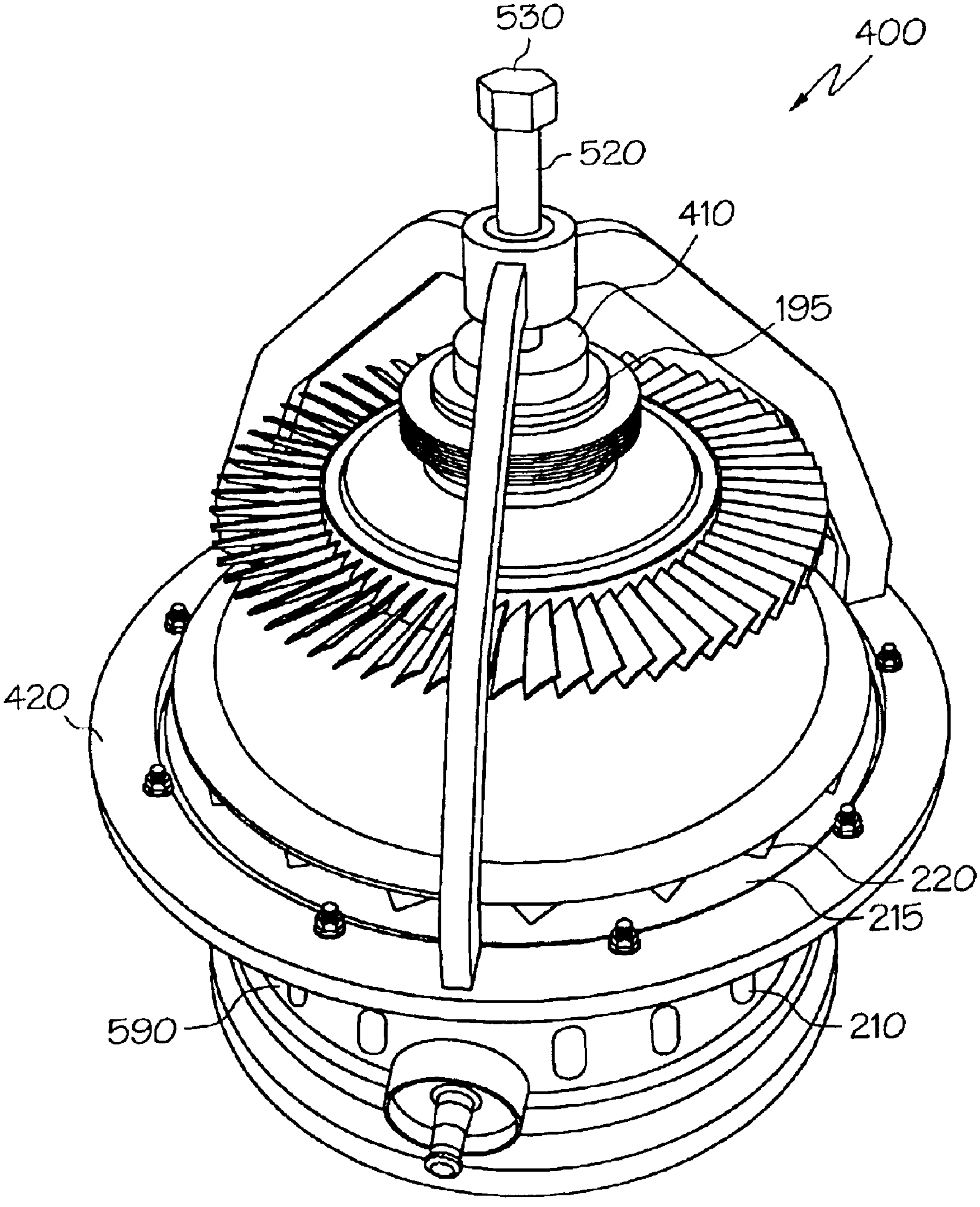
FIG. 8 is a perspective view of the tool depicted in FIG. 4 positioned on the compressor section depicted in FIG. 3.

Turning now to FIG. 8, the use of the tool 400 for assembly, maintenance, or repair of the engine 100 will now be described. As FIG. 8 illustrates, in the depicted embodiment, the tool 400 is placed on the turbofan jet engine 100 and, more particularly, on the high pressure 160 compressor section. The low pressure section 150 is disassembled from the high pressure section 160, such that the low pressure shaft 190 is disassembled from the impeller shaft 195. Resultingly, the impeller shaft 195, impeller 215, shroud 220 and high pressure diffuser case 210 are exposed.

Thereafter, a stretch tool (not illustrated) or any other tool which may stretch the impeller shaft 195, may be installed to stretch the impeller shaft 195 to a desired pre-determined value. Once the impeller shaft 195 is stretched, the stretch tool is removed. In the preferred embodiment, the tool 400 is installed by being coupled to the high pressure diffuser case collar 212. The holes 580 located on the base 420 of the tool 400 are lined up with threaded holes in the high pressure diffuser case collar 212. Screws are then threaded through the holes 580 on the base 420 and the holes in the high pressure diffuser case collar 212. Once the tool 400 is secured to the collar 212, a torque wrench, set at a predetermined torque, is then applied to the adjustment nut 530. The adjustment nut 530 thereby axially moves the rod 450, until the desired torque is achieved. A feeler gauge, or any one of other numerous tools that measure clearance, may then be inserted between the impeller 215 and shroud 220 to determine whether the clearance between the impeller 215 and the shroud 220 meets a predetermined value. If the distance between the impeller 215 and shroud 220 does not meet the predetermined value, the adjustment nut 530 is disengaged from the rod 250 and mechanical shims may be fitted or removed from between the shroud and engine to obtain the appropriate clearance.

The tool 400 can be used for centering the impeller shaft 195 in relation to the other high pressure portion 160 components for an engine where the high pressure shaft is supported by any number of bearings. Variation of the tool 400 can be used to align other engine shafts as well. The present invention is useful for removing variation from the shim process and can remove the radial play from the bearings. Further, the tool 400 loads the high pressure shaft and impeller against the bearings in an axial manner to simulate operational forces and thus how the impeller may react in the engine during operation. The tool 400 improves measurement accuracy for the mechanic during assembly, aftermarket, repair and/or overhaul of the engine.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A tool for centering an impeller shaft in a jet engine in reference to a locator surface having a plurality of locator holes thereon, the tool comprising:

a base having a main opening and a plurality of locator openings extending therethrough, the plurality of locator openings formed and spaced apart to substantially collocate with the locator holes for coupling the tool to the locator surface;

a plurality of arms, each having a first end coupled to the base and a second end separated from the locator surface; and an actuator mounted on the arms and aligned on a predetermined axis to engage the impeller shaft, apply force thereto and align the shaft with the predetermined axis.

2. The tool of claim 1, wherein the actuator comprises:

a hub, having an outer surface and opening therethrough that forms an inner surface; and a rod inserted through the hub opening and adjustably moveable axially therein, the rod having at least a first end adapted to engage the impeller shaft.

3. The tool of claim 2, wherein:

the hub inner surface includes threads with a predetermined thread pitch; and the rod has an outer surface that includes threads with the predetermined thread pitch.

4. The tool of claim 2, further comprising:

a sleeve having an inner surface and an outer surface, the sleeve outer surface coupled to the hub inner surface and the sleeve inner surface having threads with a predetermined thread pitch.

wherein the rod has an outer surface that includes threads with the predetermined thread pitch.

5. The tool of claim 2, wherein:

the first end of the rod includes a lower surface having at least a portion thereof that is beveled to a predetermined angle and sized to engage the impeller shaft.

6. The tool of claim 2, wherein:

the rod further includes a second end and the tool further comprises:

a nut coupled to the second end of the rod.

7. The tool of claim 1, wherein:

the opening is dimensioned to allow the base to surround at least a portion of the jet engine.

8. The tool of claim 2, wherein the tool further comprises:

a shaft engagement piece coupled to the first end of the rod, the shaft engagement piece having at least a portion thereof that is beveled to a predetermined angle.

9. The tool of claim 1, wherein:

the plurality of arms is three arms.

10. A tool for centering an impeller shaft in a jet engine with reference to a locator surface having a plurality of locator holes thereon, comprising:

a base having a main opening and a plurality of locator openings extending therethrough, the plurality of locator openings formed and spaced apart to substantially collocate with the locator holes for coupling the tool to the locator surface;

a hub having a threaded inner surface defining an opening;

a plurality of arms, each arm having a first end mounted to the base and a second end mounted to the hub to locate the hub along a predetermined axis; and a threaded rod, engaged with the threaded inner surface of the hub, the threaded rod having at least a first end adapted to engage the shaft and a second end adapted to engage a nut, and having an outer surface that includes threads with the predetermined thread pitch.

11. The tool of claim 10, further comprising:

a sleeve having an inner surface and an outer surface, the sleeve outer surface coupled to the threaded inner surface of the hub and the sleeve inner surface having threads with a predetermined thread pitch.

12. The tool of claim 10, wherein:

the plurality of arms is three arms.

13. A tool for centering an impeller shaft in a jet engine in reference to a locator surface, the tool comprising:

a base having an opening extending therethrough, the base adapted-for coupling the tool to the locator surface;

a plurality of arms, each having a first end coupled to the base and a second end separated from the locator surface; and an actuator mounted on the arms and aligned on a predetermined axis to engage the impeller shaft, apply force thereto and align the shaft with the predetermined axis, the actuator comprising:

a hub, having an outer surface and opening therethrough that forms an inner surface; and a rod inserted through the hub opening and adjustably moveable axially therein, the rod having at least a first end adapted to engage the impeller shaft, and a sleeve having an inner surface and an outer surface, the sleeve outer surface coupled to the hub inner surface and the sleeve inner surface having threads with a predetermined thread pitch, wherein the rod has an outer surface that includes threads with the predetermined thread pitch.

14. A tool for centering an impeller shaft in a jet engine in reference to a locator surface, the tool comprising:

a base having an opening extending therethrough, the base adapted-for coupling the tool to the locator surface;

a plurality of arms, each having a first end coupled to the base and a second end separated from the locator surface; and an actuator mounted on the arms and aligned on a predetermined axis to engage the impeller shaft, apply force thereto and align the shaft with the predetermined axis, the actuator comprising:

a hub, having an outer surface and opening therethrough that forms an inner surface; and a rod inserted through the hub opening and adjustably moveable axially therein, the rod having at least a first end adapted to engage the impeller shaft, the first end of the rod includes a lower surface having at least a portion thereof that is beveled to a predetermined angle and sized to engage the impeller shaft.

15. A tool for centering an impeller shaft in a jet engine in reference to a locator surface, the tool comprising:

a base having an opening extending therethrough, the base adapted-for coupling the tool to the locator surface;

a plurality of arms, each having a first end coupled to the base and a second end separated from the locator surface; and an actuator mounted on the arms and aligned on a predetermined axis to engage the impeller shaft, apply force thereto and align the shaft with the predetermined axis, the actuator comprising:

a hub, having an outer surface and opening therethrough that forms an inner surface, a rod inserted through the hub opening and adjustably moveable axially therein, the rod having at least a first end adapted to engage the impeller shaft, and a shaft engagement piece coupled to the first end of the rod, the shaft engagement piece having at least a portion thereof that is beveled to a predetermined angle.

16. A tool for centering an impeller shaft in a jet engine with reference to a locator surface, comprising:

a base having an opening extending therethrough, the base adapted for coupling the tool to the locator surface;

a hub having a threaded inner surface defining an opening;

a sleeve having an inner surface and an outer surface, the sleeve outer surface coupled to the threaded inner surface of the hub and the sleeve inner surface having threads with a predetermined thread pitch;

a plurality of arms, each arm having a first end mounted to the base and a second end mounted to the hub to locate the hub along a predetermined axis; and a threaded rod, engaged with the threaded inner surface of the hub, the threaded rod having at least a first end adapted to engage the shaft and a second end adapted to engage a nut, and having an outer surface that includes threads with the predetermined thread pitch.

* * * * *